United States Patent
Aikawa

(10) Patent No.: US 9,124,728 B2
(45) Date of Patent: Sep. 1, 2015

(54) COMMUNICATION SYSTEM FOR DIGITAL CAMERA AND MOBILE DEVICE WITH VARIABLE VERIFICATION

(71) Applicant: RICOH IMAGING COMPANY, LTD., Tokyo (JP)

(72) Inventor: Tomonori Aikawa, Kanagawa (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/140,841

(22) Filed: Dec. 26, 2013

(65) Prior Publication Data

US 2014/0184822 A1 Jul. 3, 2014

(30) Foreign Application Priority Data

Dec. 27, 2012 (JP) ................................. 2012-285693

(51) Int. Cl.
  *H04N 5/232* (2006.01)
  *H04N 1/00* (2006.01)
  *H04N 101/00* (2006.01)

(52) U.S. Cl.
  CPC ......... *H04N 1/00103* (2013.01); *H04N 1/0001* (2013.01); *H04N 1/00042* (2013.01); *H04N 1/00055* (2013.01); *H04N 1/00068* (2013.01); *H04N 2101/00* (2013.01); *H04N 2201/0084* (2013.01); *H04N 2201/0086* (2013.01); *H04N 2201/0087* (2013.01)

(58) Field of Classification Search
  USPC .................. 348/207.99, 222.1, 231.7, 333.04; 396/321; 711/115
  See application file for complete search history.

(56) References Cited

U.S. PATENT DOCUMENTS

| | | | |
|---|---|---|---|
| 7,552,180 B2 * | 6/2009 | Sugawara et al. | 709/206 |
| 8,225,010 B2 * | 7/2012 | Tsujii | 710/16 |
| 8,392,957 B2 * | 3/2013 | Holt et al. | 725/105 |
| 8,411,152 B2 | 4/2013 | Kaibara | |
| 8,533,371 B2 * | 9/2013 | Tsujii | 710/16 |
| 2006/0290974 A1 * | 12/2006 | Kano et al. | 358/1.15 |
| 2009/0033749 A1 * | 2/2009 | Motoki et al. | 348/207.99 |
| 2012/0084397 A1 * | 4/2012 | Shinohara | 709/217 |

FOREIGN PATENT DOCUMENTS

| | | |
|---|---|---|
| JP | 2010-252054 | 11/2010 |
| JP | 4708824 | 6/2011 |

* cited by examiner

*Primary Examiner* — Ngoc-Yen Vu
(74) *Attorney, Agent, or Firm* — Greenblum & Bernstein, P.L.C.

(57) ABSTRACT

A device is provided that includes a recording medium with embedded communication functionality, a communication controller, a communication status verifier, a communication period calculator, and a verification interval setter. The recording medium stores data. The communication controller transmits the data to an external system via the recording medium. The communication status verifier obtains the communication status of the recording medium at a predetermined interval. The communication period calculator estimates a communication period required by the communication controller when transmitting the data to the external system. The verification interval setter relatively increases the frequency of the communication status verification, which is performed by the communication status verifier, from a predetermined time before or a predetermined time after the end of the estimated communication period until the obtained communication status indicates completion of the data transmission.

6 Claims, 6 Drawing Sheets

FIG. 5

| SIZES OF<br>TRANSFERRED FILES<br>AND TOTAL TIME | SIZES OF<br>NON-TRANSFERRED FILES<br>AND TOTAL TIME |
|---|---|
| 4.35MB | 1.98MB |
| 3.2MB | 2.82MB |
| 2.11MB | |
| 24s | PREDICTED TIME: 4.8MB*(24s/9.66MB) |

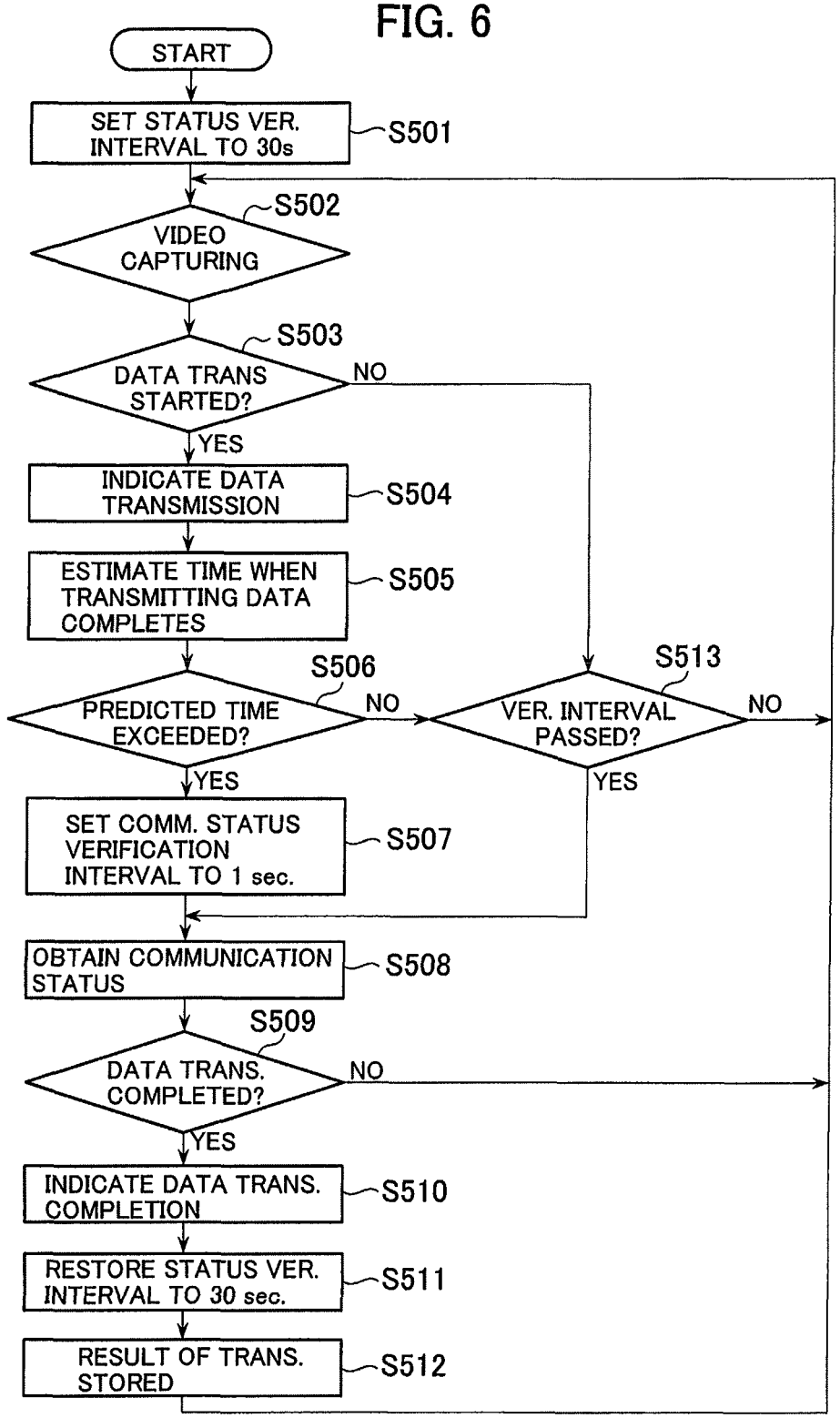

COMMUNICATION SYSTEM FOR DIGITAL CAMERA AND MOBILE DEVICE WITH VARIABLE VERIFICATION

BACKGROUND OF THE INVENTION

1. Field of the Invention

The present invention relates to a digital camera, more specifically, to a system that verifies a data transmission status.

2. Description of the Related Art

There is known a digital camera that is able to transmit a captured image swiftly to an external device via a recording medium that is provided with wireless communication functionality. For example, the U.S. Pat. No. 8,411,152 discloses a method for swiftly transmitting image data that are stored according to the Design rule for Camera File system (DCF) in a memory card provided with wireless communication functionality.

SUMMARY OF THE INVENTION

It is essential for a digital camera to maintain continuous access to a specific file in the recording medium to monitor communication status, for example to determine whether or not the transmission of image data from a recording medium embedded with communication functionality is completed. When the specific file of the recording medium is being accessed to write or read data, the recording medium needs to suspend data communication. Therefore, a conventional digital camera generally maintains a regular time interval for performing communication status verification, such as 30 seconds, to avoid disturbing data communication as much as possible. Accordingly, about 30 seconds of delay from the actual completion of data transmission may exist until a user is notified of the completion of data transmission. Therefore, a conventional camera, such as disclosed in the U.S. Pat. No. 8,411,152, cannot swiftly provide information regarding changes of communication status (e.g., completion of data transmission) to a user.

Accordingly, one aspect of the present invention is to provide a digital camera that is able to promptly acknowledge a change in communication status to a user.

According to the present invention, a digital camera is provided that includes a recording medium with embedded wireless functionality, a communication controller, a communication status verifier, a communication period calculator, and a verification interval setter.

The recording medium with embedded wireless functionality stores image data. The communication controller transmits the image data to an external system via the recording medium with embedded wireless functionality. The communication status verifier obtains at a predetermined interval the communication status of the recording medium with embedded wireless functionality. The communication period calculator estimates a communication period required by the communication controller when transmitting the image data to the external system. The verification interval setter relatively increases the frequency of communication status verification, which is performed by the communication status verifier, from a predetermined time before or a predetermined time after the end of the estimated communication period until the obtained communication status indicates completion of the image data transmission.

Further, according to another aspect of the present invention, a communication system of a mobile device is provided that includes a recording medium, a communicator, a communication controller, a communication status verifier, a communication period calculator, and a verification interval setter.

The recording medium stores data. The communicator communicates with an external system. The communication controller transmits the data stored in the recording medium to the external system. The communication status verifier obtains the communication status of the recording medium at a predetermined interval. The communication period calculator estimates a communication period required by the communication controller when transmitting the data to the external system. The verification interval setter relatively increases the frequency of communication status verification, which is performed by the communication status verifier, from a predetermined time before or a predetermined time after the end of the estimated communication period until the obtained communication status indicates completion of the data transmission.

BRIEF DESCRIPTION OF THE DRAWINGS

The objects and advantages of the present invention will be better understood from the following description with references to the accompanying drawings in which:

FIG. 5 is a diagram schematically illustrating an example of how data transfer time is predicted; and FIG. 6 illustrates a flowchart of a second embodiment of the present invention.

DESCRIPTION OF THE PREFERRED EMBODIMENTS

Figure 1A:
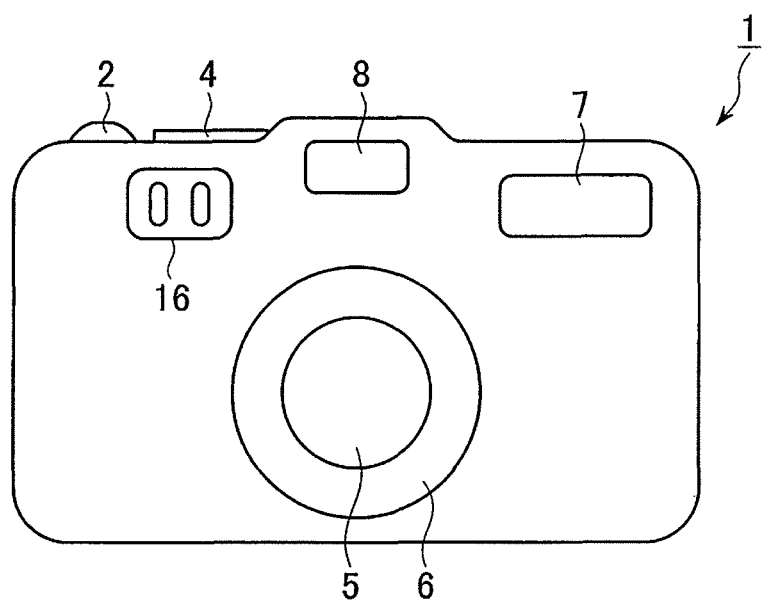
FIGS. 1A-1C are a front view, a top view, and a rear view of a digital camera, in which an embodiment of the present invention is applied.
Figure 1B:
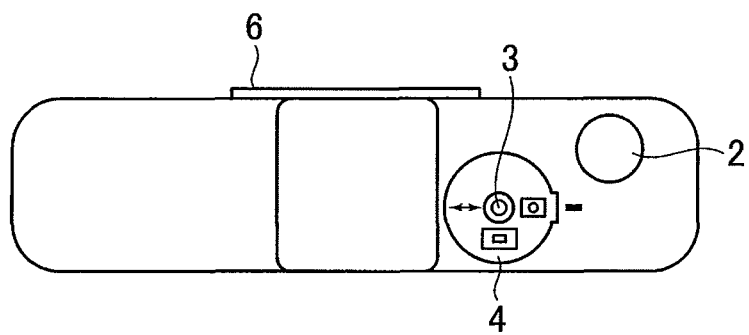
Figure 1C:
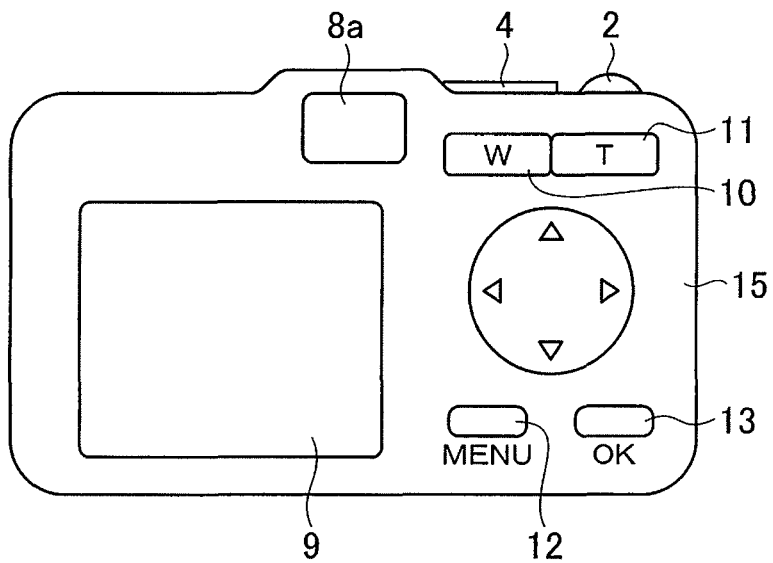

The present invention is described below with references to the embodiments shown in the drawings. FIGS. 1A-1C are a front view, a top view, and a rear view of a digital camera, in which a first embodiment of the present invention is applied.

As illustrated in FIGS. 1A-1C, a release button (a shutter button) 2, a power switch 3, and a mode dial 4, including a photographing mode and a playback mode, are provided on the top surface of the digital camera 1. A lens barrel unit 6 provided with a photographing lens system 5, a flash 7, an optical finder 8, and an AF optical system 16 are configured on the front face of the digital camera 1.

On the backside of the digital camera 1, a monitor 9, such as an LCD, an eyepiece 8a of the optical finder 8, a zoom-out switch 10 for wide angle (W) view, a zoom-in switch 11 for telephoto (T) view, a menu button 12, and an OK button 13 may be provided. Further, inside a side portion 15 of the digital camera 1 is mounted a detachable recording medium 32, such as a memory card. The recording medium 32 is provided with wireless communication functionality, including a memory card with embedded wireless LAN, and captured image data are stored therein.

Figure 2:
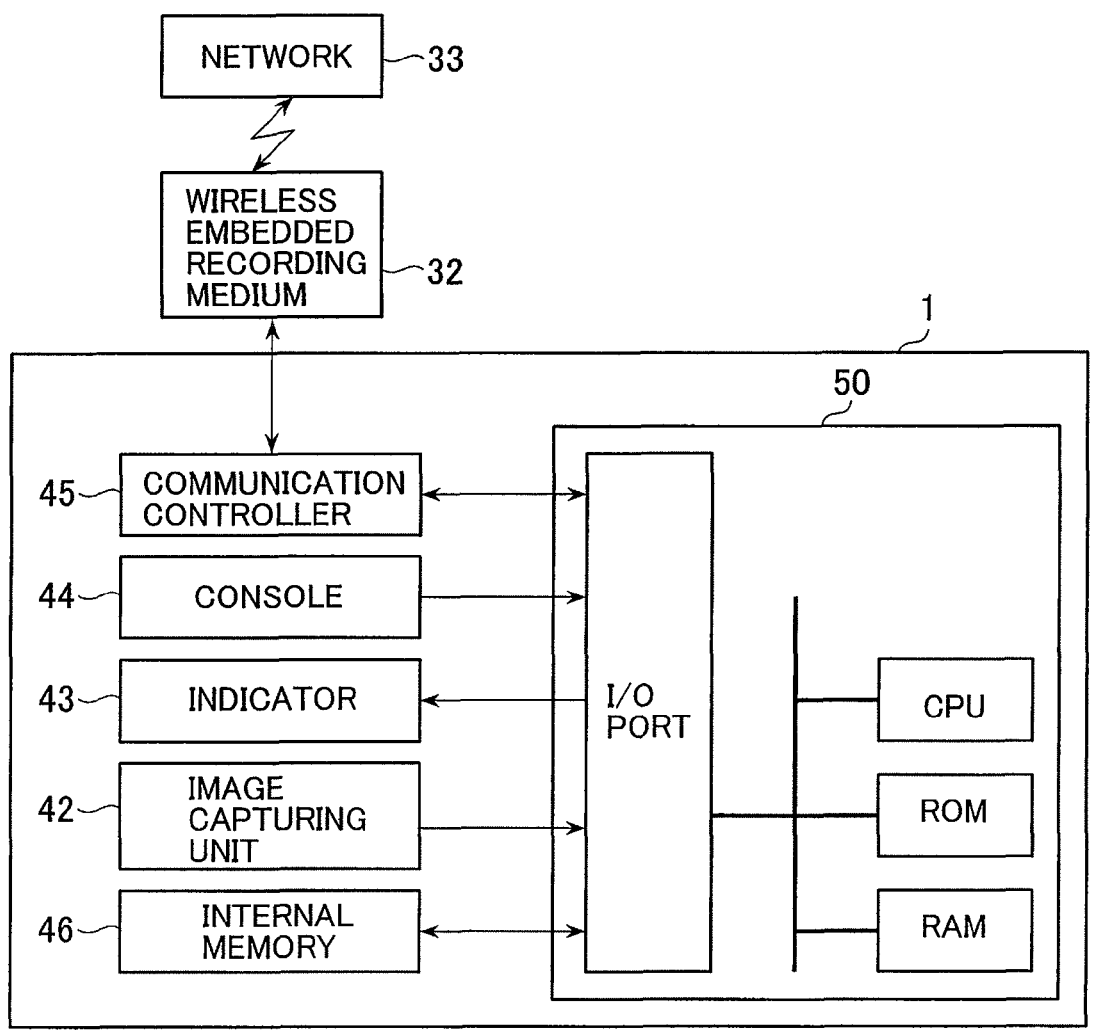
FIG. 2 illustrates an electrical schematic of the digital camera.

FIG. 2 illustrates an electrical schematic of the digital camera 1 that is shown in FIGS. 1A-1C. The digital camera 1 includes the recording medium 32, an image capturing unit 42 including a CCD, an AD convertor and the like, an indicator 43, a console 44, a communication controller 45, which may include an SDIO interface, a non-volatile internal memory 46, and a controller 50 generally controlling the entire camera 1.

The controller 50 may be a microcontroller that includes a CPU, a ROM, a RAM, I/O port, and buses. Note that the controller 50 may operate multiple processes in parallel so that a communication managing process can also be performed in parallel with video capturing, as will be discussed later with reference to FIG. 6.

Further, the digital camera 1 is capable of connecting to a network 33 via the recording medium 32 provided with wireless communication functionality. Incidentally, image data may be recorded either in the non-volatile internal memory 46 or in the recording medium 32.

Figure 3:
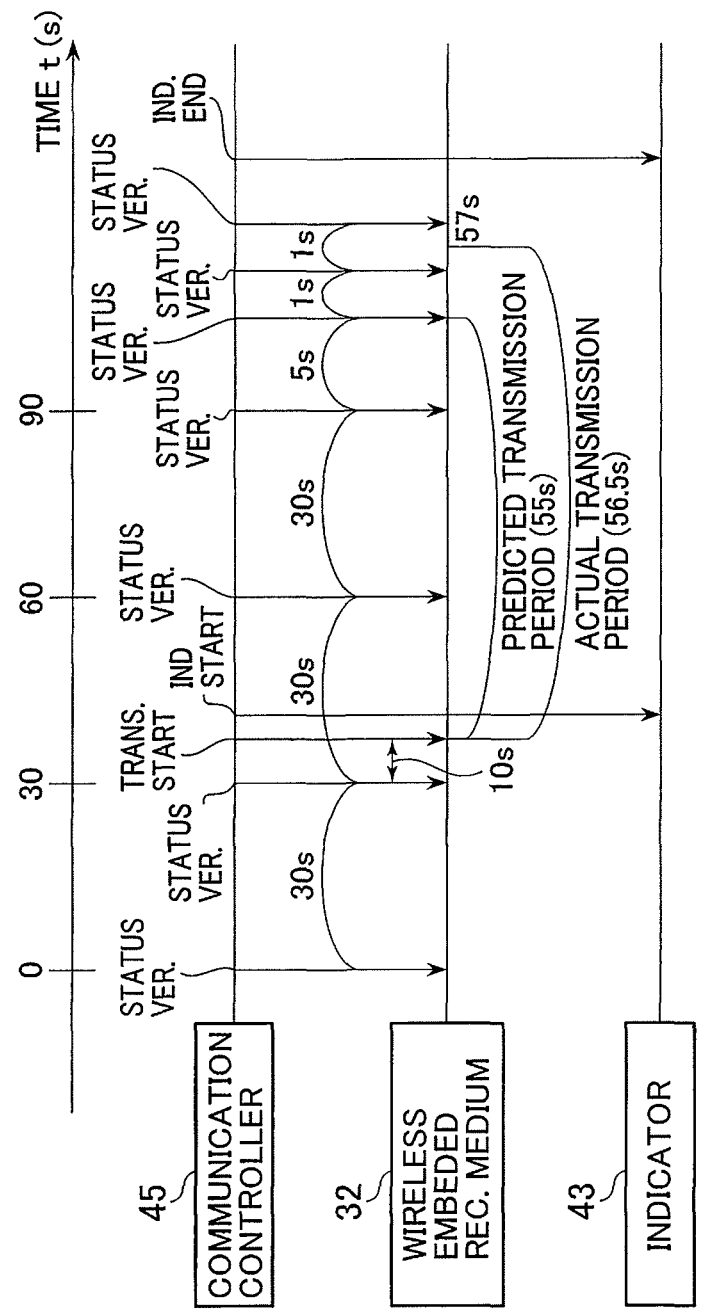
FIG. 3 is a timing chart showing intervals of communication status verification.

FIG. 3 is a timing chart that indicates the process of altering the frequency for performing communication status verification. The communication controller 45 obtains the communication status of the recording medium 32, which is embedded with wireless communication functionality, every 30 seconds before a data transmission is started.

The communication status may include "establishing wireless communication", "wireless communication disconnected", "non-transferred file exists", and "non-transferred file does not exist". The obtained status may be indicated on the indicator 43 when required. In this timing chart, the data transmission is started when the communication status is verified at a regular interval 30 seconds, for example.

When data transmission is started, the communication controller 45 instructs the indicator 43 to indicate commencement of data transmission. Further, the communication controller 45 predicts the time when the data transmission will be completed. When a predicted time for completion of the data transmission is 55 seconds, for example, the communication controller 45 continues the communication status verification at every 30 seconds until the data transmission ends. However, a regular time interval for obtaining the communication status is altered from 30 seconds to 5 seconds just before it reaches the above-mentioned predicted time in which the data transmission should be completed.

When the status of "non-transferred file does not exist" is not obtained, the recording medium with embedded wireless communication functionality 32 continues transmitting data so that the communication status verification interval is set to a relatively short period (here, 1 second as an example), and the status verification is repeated at this relatively high frequency of 1 Hz. In this example, the actual time spent transmitting data (a communication period) is 56.6 seconds, therefore, the status "non-transferred file does not exist" can be obtained 57 seconds after the start of the data transmission so that an indication of the completion of the data transmission may be displayed on the indicator 43 as instructed by the communication controller 45. As described above, after the predicted time for the completion of the data transmission has elapsed, the communication status is verified before the preset 30 seconds elapse.

As described above, the interval of the communication status verification is set to a relatively short time from slightly (a predetermined time) before or slightly (a predetermined time) after the predicted time for completion of the data transmission. In this embodiment, the term relatively short time denotes a period from about 2% to about 10% of the entire data transmission time. Further, a value of the above predetermined time set before the predicted completion of the data transmission may be less than or equal to about 10% of the entire data transmission time. And a value of the above predetermined time set after the predicted completion of the data transmission may be less than or equal to about 2% of the entire data transmission time. Note that a period in which the interval of the communication status verification is set to a relatively short time should include a certain period after the above predicted time. Further, the interval is generally reset to the regular value sometime after the predicted time, at least after communication status indicating the completion of the data transmission is obtained.

Figure 4:
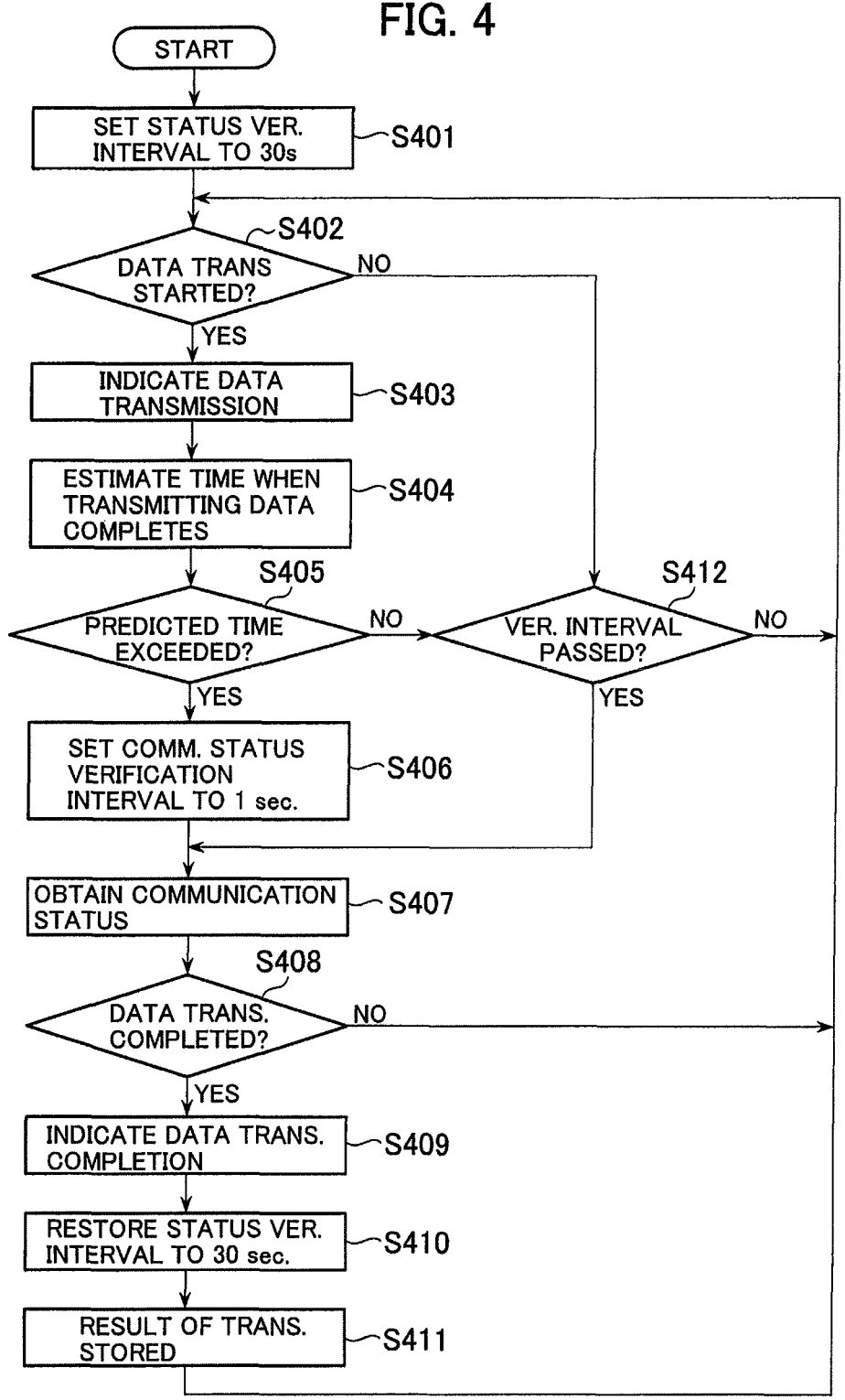
FIG. 4 is a flowchart of the process for altering the status verification frequency of a first embodiment.

FIG. 4 is a flowchart of the process for altering the status verification frequency described in FIG. 3, which may be carried out by the communication controller 45 in cooperation with the controller 50. First, the communication controller 45 presets the interval of the communication status verification to an initial value, such as 30 seconds, at Step S401.

When a transmission data file is created in the recording medium with embedded wireless functionality 32, whether or not data transmission is started is determined in Step S402. When it is determined that data transmission has already been started, the communication controller 45 instructs the indicator 43 to indicate execution of data transmission in Step S403. The communication controller 45 then predicts or calculates a time period that is required to complete the data transmission in Step S404. As detailed latter with reference to FIG. 5, the above-mentioned time period is estimated on the basis of the performance of the recording medium 32 and the size of a non-transferred file or files. When it is determined in Step S405 that the predicted time period has elapsed, the communication controller 45 changes the interval of the communication status verification to a relatively short time in Step S406, for example, to one second.

In Step S407, the communication controller 45 obtains the communication status of the recording medium 32. When it is determined in Step S408 that the communication status does not indicate the completion of the data transmission, the process returns to Step S402. On the other hand, when it is determined that the communication status indicates the completion of the data transmission, the completion of the data transmission may be notified on the indicator 43 in Step S409 and the interval of the communication status verification is restored to the initial value in Step S410. In Step S411, the size of the file(s) that was transferred and the time spent transmitting the data are stored in the internal memory 46 and the process returns to Step 402.

The internal memory 46, where the result of the data transmission is recorded, is a nonvolatile memory. As described above, the internal memory 46 stores the latest result of data transmission. The result can also include averages of a file size and transfer time that are categorized by a destination of transmission for each recording medium 32 or for each memory card. For example, the time period may be predicted from the latest result of data transmission, but it can also be predicted from an average size of transferred image data in a card memory, which may be categorized with respect to devices or destinations of data transmission.

On the other hand, when data transmission has not been started at Step S402, whether or not an interval of the communication status verification has elapsed is determined. Further, when the predicted time period has not elapsed in Step S405, the process also proceeds to Step S412 so that whether or not an interval of the communication status verification has elapsed can be determined. When it is determined at Step S412 that a communication status verification interval has not elapsed, the process returns to Step S402. Contrarily, when a communication status verification interval has elapsed at Step S412, the process proceeds to Step S407 and the communication controller 45 obtains the present communication status at the communication status verification interval.

FIG. 5 shows an example of how data transfer time is predicted. In FIG. 5, a time required for transmitting non-transferred files is predicted or estimated from the total size of transferred files and the total time required in that transmission. As indicated in FIG. 5, transfer time per unit memory size of 24/9.66 [s/MB] is calculated from the total size 9.66 MB of the transferred files and the total transfer time 24 s. And the time required for transmitting the non-transferred files, 4.8 MB in total, is calculated by multiplying the above-calculated transfer time per unit memory size.

As described above, by predicting the communication time required for transmitting image data to an external device, system or network and increasing the frequency of the communication status verification from slightly before or slightly after the end of the data communication, a user can be promptly notified of the changes in the communication status. Specifically, the completion of image data transmission can be promptly signaled to a user.

FIG. 6 illustrates a flowchart of a second embodiment of the present invention. The difference from the first embodiment is that the updating of data in the recording medium 32 is suspended while capturing a video or moving image (non-communication period). Namely, steps other than Step S502 are the same as those in the first embodiment such that Steps S501 and S503-S513 correspond to Steps S401 and S402-S412 of FIG. 4, respectively.

In addition to the effects of the first embodiment, the second embodiment can also reduce the possibility of a drop-frame, which is caused by the interruption of a heavy load video process, by suspending the updating of the recording medium 32 while capturing a video or moving image.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2012-285693 (filed on Dec. 27, 2012), which is expressly incorporated herein, by reference, in its entirety.

The invention claimed is:

1. A digital camera, comprising:
   a recording medium, with embedded wireless communication functionality, that stores image data;
   a communication controller that transmits the image data to an external system via the recording medium with embedded wireless functionality;
   a communication status verifier that obtains, at a predetermined interval, a communication status of the recording medium with embedded wireless functionality;
   a communication period calculator that estimates a communication period required by the communication controller when transmitting the image data to the external system; and
   a verification interval setter that increases frequency of a communication status verification, which is performed by the communication status verifier, in a specific period from a predetermined time before or a predetermined time after an end of the estimated communication period until an obtained communication status indicates completion of the image data transmission.

2. The digital camera according to claim 1, further comprising a transfer time recording medium that stores a size and transfer time of transferred image data, the communication period calculator estimates the communication period according to the size and the transfer time of the transferred image data stored in the transfer time recording medium and a size of non-transferred image data stored in the recording medium with embedded wireless functionality.

3. The digital camera according to claim 1, wherein the communication controller suspends transmission of the image data while capturing video.

4. The digital camera according to claim 1, further comprising an indicator that indicates the communication status obtained by the communication status verifier.

5. The digital camera according to claim 1, wherein, the verification interval setter sets a first interval as the predetermined interval in the specific period, and sets a second interval, which is longer than the first interval, as the predetermined interval in a period other than the specific period, and the communication status verifier obtains the communication status at the first interval in the specific period, and obtains the communication status at the second interval in the period other than the specific period.

6. A communication system of a mobile device, comprising:
   a recording medium that stores data;
   a communicator that communicates with an external system;
   a communication controller that transmits the data stored in the recording medium to the external system;
   a communication status verifier that obtains the communication status of the recording medium at a predetermined interval;
   a communication period calculator that estimates a communication period required by the communication controller when transmitting the data to the external system; and
   a verification interval setter that increases a frequency of the communication status verification, which is performed by the communication status verifier, in a specific period from a predetermined time before or a predetermined time after an end of the estimated communication period until the obtained communication status indicates completion of the data transmission.

* * * * *